United States Patent [19]
Watanabe et al.

[11] Patent Number: 4,616,290
[45] Date of Patent: Oct. 7, 1986

[54] ELECTRIC DOUBLE LAYER CAPACITOR

[75] Inventors: Koichi Watanabe, Osaka; Michihiro Murata, Kyoto, both of Japan

[73] Assignee: Murata Manufacturing Co., Ltd., Nakaokakyo, Japan

[21] Appl. No.: 601,700

[22] Filed: Apr. 18, 1984

[30] Foreign Application Priority Data

Apr. 19, 1983 [JP] Japan .................................. 58-69621
Apr. 27, 1983 [JP] Japan .................................. 58-75604

[51] Int. Cl.$^4$ .......................... H01G 4/38; H01G 9/00
[52] U.S. Cl. ..................................... 361/328; 361/433
[58] Field of Search ............... 361/328, 331, 433 J, 361/433 A, 433 L, 433 S, 433 C

[56] References Cited

U.S. PATENT DOCUMENTS 4,349,862 9/1982 Bajorek et al. ............... 361/328 X
4,531,281 7/1985 Murray et al. .............. 361/433 A X

FOREIGN PATENT DOCUMENTS 3222938 1/1983 Fed. Rep. of Germany ...... 361/328
54-97770 8/1979 Japan .
55-162218 12/1980 Japan .

Primary Examiner—Donald A. Griffin
Attorney, Agent, or Firm—Finnegan, Henderson, Farabow, Garrett & Dunner

[57] ABSTRACT

An electric double layer capacitor includes an insulative gasket for receiving a plurality of double layer capacitive elements. A common electrode is provided on each end of the gasket to connect the capacitive elements all in series, all in parallel, or in some combination of serial and parallel.

8 Claims, 9 Drawing Figures

ELECTRIC DOUBLE LAYER CAPACITOR

FIELD OF THE INVENTION

This invention relates to a monoblock electric double layer capacitor which comprises a plurality of electric double layer capacitor elements.

BACKGROUND OF THE INVENTION

Electric double layer capacitors include a standard example as shown in FIG. 1. This capacitor consists of an integrated body comprising two insulating gaskets 1 and 2 which have respective polarizable electrodes 5 and 6 composed of active carbon and an electrolyte received in their respective openings 3 and 4 with an ion-permeable separator 7 interposed therebetween. Collector electrodes 8 and 9 are provided on the outer side of the respective electrodes 5 and 6.

This kind of a capacitor is advantageous in that it can have a high capacitance level which cannot be attained by conventional capacitors but is disadvantageous in that its electric strength is less than a few volts.

Therefore, to raise the electric strength, a plurality of such capacitors may be accumulated and electrically connected in series. Such a capacitor is disclosed in Japanese Patent Application Disclosure No. 97770/79. This capacitor is disadvantageous in that the multilayer accumulation structure makes it bulky and such a structure of large size is not suitable for miniaturization. To solve this disadvantage, a structure shown in Japanese Patent Application Disclosure No. 162218/80 may be utilized.

This improved structure is shown in FIG. 2 as including first electrodes 13a and 13b and second electrodes 16a, 16b and 16c. The first electrodes 13a and 13b include polarizable electrode bodies 11 bounded by an electrically-conductive plate 12. The second electrodes 16a, 16b and 16c have a pair of polarizable electrodes 14a and 14b bounded by an electrically-conductive plate 15.

The first electrode 13a and a second electrode 16a are separated by a separator 17a interposed therebetween. The second electrodes 16a and 16b are separated by a separator 17b interposed therebetween. The second electrodes 16b and 16c are separated by a separator 17c interposed therebetween. The second electrode 16c and the first electrode 13b are separated by a separator 17d interposed therebetween. Both of the plates 12 and 15 use an electrically conductive material resulting in this structure having the disadvantage that it needs more electrically-conductive plates as more double layer capacitor cells are connected in series to raise the electric strength. The more electrically-conductive plates that are used, the more difficult are connections between cells and the provision of terminals. Furthermore, there is still some limitation on miniaturization. In addition, its structure for reception into a cell is complicated.

OBJECTS AND SUMMARY OF THE INVENTION

It is an object of the present invention to provide a monoblock electric double layer capacitor which includes a plurality of electric double layer capacitor elements.

It is another object of the present invention to provide electric double layer capacitor elements which can be electrically connected in series to increase electric strength.

It is still another object of the present invention to provide an electric double layer capacitor which includes thereinside a plurality of electric double layer capacitor elements which can be electrically connected in parallel.

Therefore, this invention is intended to provide an electric double layer capacitor which comprises a combination of electric double layer capacitor elements which are formed of a polarizable electrode received in a plurality of openings piercing through upper and lower gaskets with a separator interposed therebetween and a collector electrode provided on the outer surfaces of the polarizable electrodes for electrically connecting the capacitor elements partially or entirely in series.

Further, this invention is intended to provide an electric double layer capacitor which comprises polarizable electrodes having a separator interposed therebetween, collector electrodes provided on the surface of the polarizable electrodes and insulating materials provided on the circumference of the polarizable electrodes and interposed between the collector electrodes, wherein the collector electrodes comprise an insulating material having an electrically-conductive layer to be brought into contact with the polarizable electrode formed on one side thereof and an electricallyconductive connecting layer to be brought in conduction with the electrically-conductive layer for the polarizable electrode formed on the other side.

DETAILED DESCRIPTION OF THE PREFERRED EMBODIMENTS

Figure 4:
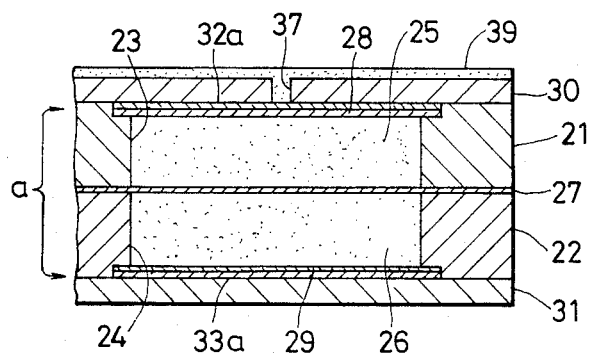
FIG. 4 is an enlarged sectional view of part of a complete unit assembled from the components shown in FIG. 3.
Figure 5:
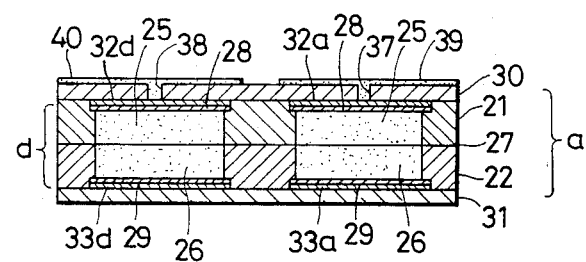
FIG. 5 is a sectional view taken along the line 5—5 of FIG. 3 when the components are assembled into the complete unit.
Figure 3:
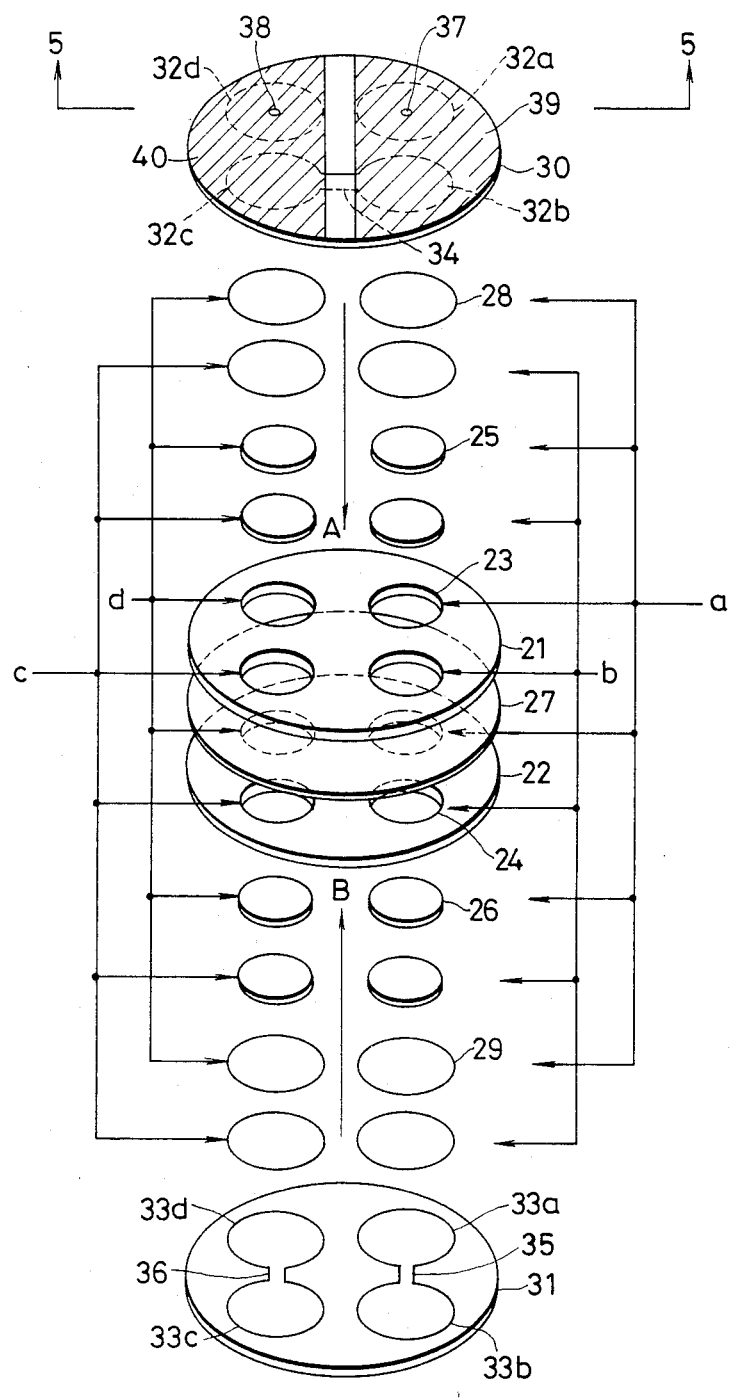
FIG. 3 is an exploded perspective view illustrating an embodiment of the present invention.

This invention will be further described by referring to FIGS. 3 through 5 which show an embodiment of this invention. FIG. 3 shows an exploded perspective view of the embodiment. FIG. 4 shows an enlarged sectional view of an essential part of a complete unit assembled from the components shown in FIG. 3. FIG. 5 shows a sectional view taken along the line 5—5 of FIG. 3 when the components are assembled into the complete unit.

Referring now to these drawings, an upper gasket 21 and a lower gasket 22 of a material such as rubber and resin include a plurality of openings 23 and 24 piercing therethrough. Polarizable electrodes 25, 26 are received in the openings 23 and 24, respectively. These polarizable electrodes 25, 26 are made of a mixture of active carbon and an electrolyte and may be formed before being inserted into the openings 23 and 24 or may be injected therein in the form of paste. These polarizable electrodes 25 and 26 should be fitted in the openings 23 and 24, respectively, when the components are assembled into the complete unit.

A separator 27 is adapted to be interposed between the upper gasket 21 and the lower gasket 22. The separator 27 may be made from a polyolefin compound which promotes ionic conduction but prevents electronic conduction. Although the illustrative embodiment uses only one sheet of separator 27, a separator covering the area of the openings 23 and 24 and their circumference may be individually provided for interposition.

A collector electrode 28 is provided on the upper surface of the upper gasket 21 and is adapted to be brought into contact with the outer surface of the polarizable electrodes 25. A collector electrode 29 is provided on the lower surface of the lower gasket 22 and is adapted to be brought into contact with the outer surface of the polarizable electrodes 26.

The polarizable electrodes 25 and 26, the separator 27 received in the upper and lower gaskets 21 and 22, and the collector electrodes 28 and 29 are assembled as shown by the arrows A and B to provide an integrated body which has electric double layer capacitor elements a to d formed therein. For assembly into an integrated body, these components may be bonded with an adhesive. Specifically, the upper and lower gaskets 21 and 22 are bonded to the separator 27 and to the respective collector electrodes 28 and 29 with an adhesive. Alternatively, if the upper and lower gaskets 21 and 22 are made of unvulcanized rubber, these gaskets may be bonded to the separator 27 and the collector electrodes 28 and 29 by heating.

Terminal plates 30 and 31 are provided on the opposite sides of the gaskets 21 and 22, respectively. These terminal plates 30 and 31 are made of an insulating material such as phenol resin and a paper-based phenol resin. The terminal plate 30 has electrically-conductive layers 32a to 32d formed on the lower surface thereof while the terminal plate 31 has electrically-conductive layers 33a to 33d formed on the upper surface thereof. These electrically-conductive layers 32a to 32d and 33a to 33d are formed at locations corresponding to the respective electric double layer capacitor elements a to d.

The electrically-conductive layers 32b and 32c formed on the lower surface of the terminal plate 30 are electrically connected by a connection 34. The electrically-conductive layers 33a and 33b formed on the upper surface of the terminal plate 31 are electrically connected by a connection 35. The electrically-conductive layers 33c and 33d formed on the same surface are electrically connected by a connection 36. The terminal plates 30 and 31 which have such constructions are respectively bonded to the upper surface of the gasket 21 which includes the electric double layer capacitor elements a to d and the lower surface of the gasket 22 which together with the gasket 21 includes the electric double layer capacitor elements a to d as shown in FIG. 3. Accordingly, once assembled, the electric double layer elements a to d are electrically connected in series in this order. Regarding such a series combination of the electric double layer capacitor elements a to d as an integrated body, the electrically-conductive layers 32a and 32d correspond to the opposite terminals thereof. These electrically-conductive layers 32a and 32d are electrically connected to connecting electrodes 39 and 40 formed on the terminal plate 30 via respective throughholes 37 and 38 piercing therethrough.

Although the above-mentioned embodiment refers to the electrical series combination of the electric double layer capacitor elements a to d, this invention also enables a combination in which one part of the electric double layer capacitor elements is connected in series and the other part is connected in parallel.

Figure 6:
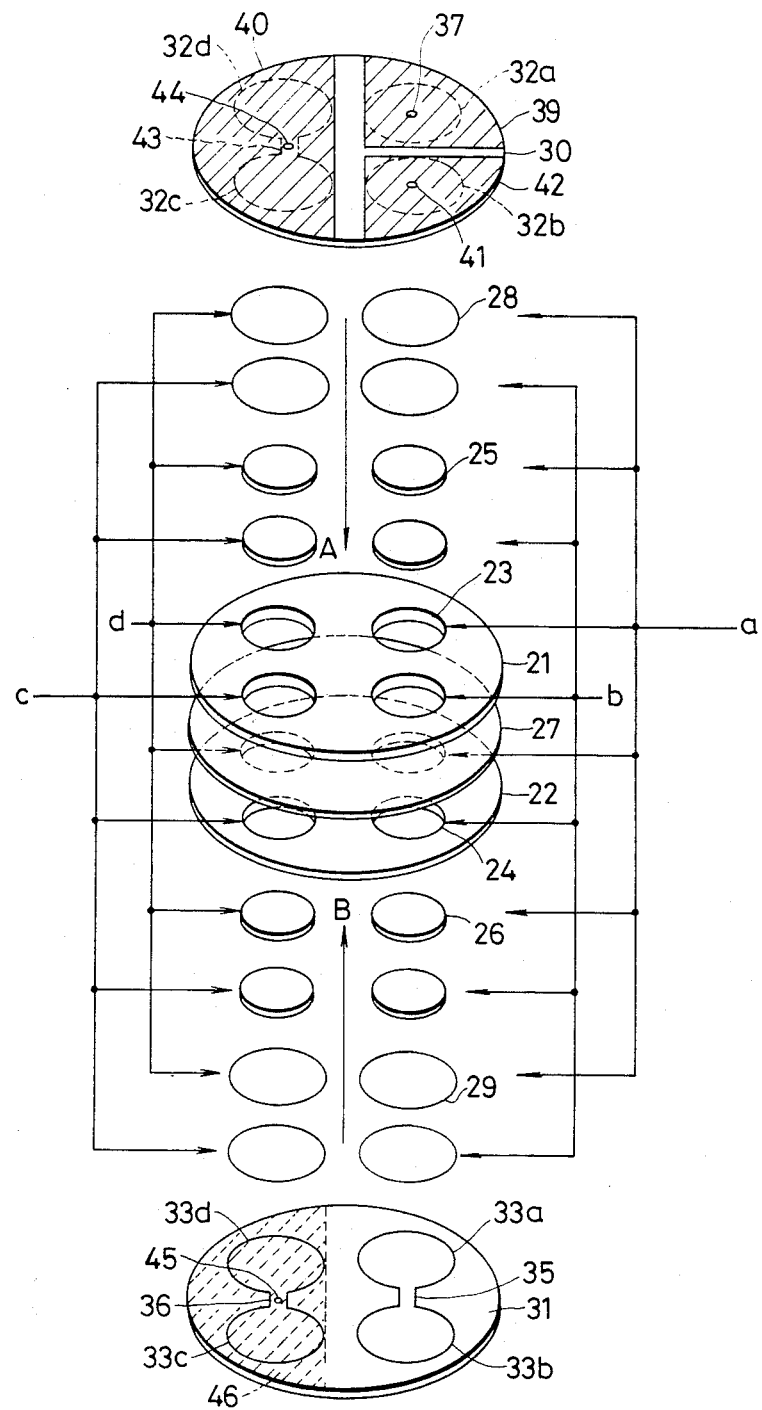
FIG. 6 is an exploded perspective view illustrating another embodiment of the present invention.

FIG. 6 shows an exploded perspective view of an embodiment of the electric double layer capacitor according to such a construction. Like numerals in this drawing indicate similarly-numbered components in FIGS. 3, 4 and 5. These components will not be further described. In the drawing, the right half of the unit shows a series combination of electric double layer capacitor elements while the left half of the unit shows a parallel combination of electric double layer capacitor elements.

Referring first to the series combination of electric double layer capacitor elements in the right half of the unit, it can be seen that the electricallyconductive layers 33a and 33b formed on the terminal plate 31 are electrically connected to each other by a connection 35. Accordingly, once assembled, electric double layer capacitor elements a and b are electrically connected in series with each other.

Electrically-conductive elements 32a and 32b which correspond to the opposite ends of an integrated body consisting of a series combination of the electric double layer capacitor elements a and b connect with connecting electrodes 39 and 42 formed on the terminal plate 30 via throughholes 37 and 41.

Referring then to the parallel combination of electric double layer capacitor elements in the left half of the unit, it can be seen that the electrically-conductive layers 32c and 32d formed on the lower surface of the terminal plate 30 are electrically connected to each other by a connection 43 while electrically-conductive layers 33c and 33d formed on the upper surface of the terminal plate 31 are electrically connected to each other by a connection 36. Accordingly, once assembled, the electric double layer capacitor elements c and d are electrically connected in parallel. The electrically-conductive layers 32c and 32d and the electrically-conductive layers 33c and 33d which correspond to the opposite ends of an integrated body consisting of the parallel combination of the electric double layer capacitor elements c and d connect with a connecting electrode 40 formed on the upper surface of the terminal plate 30 and a connecting electrode 46 formed on the lower surface of the terminal plate 31 via a throughhole 30 piercing through the terminal plate 30 and a throughhole 31 piercing through the terminal plate 31, respectively.

Figure 1:
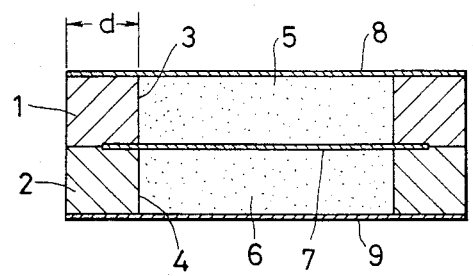
FIG. 1 illustrates the basic construction of an electric double layer capacitor.
Figure 2:
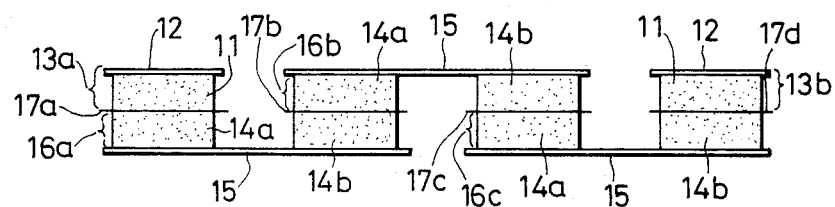
FIG. 2 schematically illustrates a conventional example of the electric double layer capacitor.

As can be seen from the above description of the embodiments, the electric double layer capacitor of the invention has its electric double layer capacitor elements received in a plurality of openings, thus enabling reduction of its thickness. Furthermore, the construction requiring a single pair of gaskets enables reduction of cost and simplification of production as compared to that requiring separate gaskets for each cell. Moreover, these electric double layer capacitor elements can be partially or entirely connected in series to improve the electric strength of the capacitor. The electric double layer capacitor of the invention has an advantage because the integrated construction, in which polarizable electrodes, separator and other capacitor components are received in a gasket, enhances air-tightness. Unlike the electric double layer capacitor shown in FIG. 1 which must have a larger width d of the gaskets 1 and 2 to enhance air-tightness, this invention provides an integrated construction which has insulating parts between the adjacent electric double layer capacitor elements for common use by the gaskets, thus enabling miniaturization.

Figure 7:
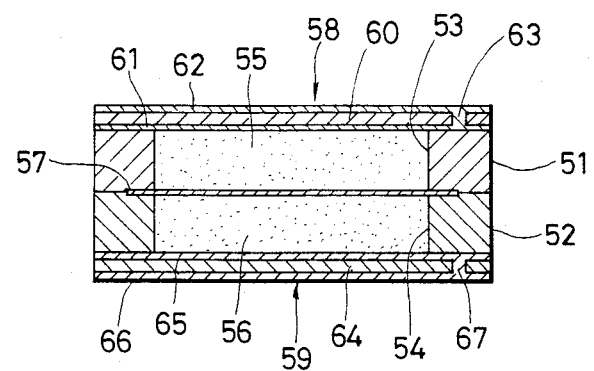
FIG. 7 is a schematic sectional view of an embodiment of the electric double layer capacitor of the present invention.

FIG. 7 is a schematic sectional view illustrating yet another embodiment of the electric double layer capacitor of the present invention.

As shown in the drawing, an upper gasket 51 and a lower gasket 52 are made of an insulating material, such as rubber or rubber in combination with resin. Openings 53 and 54 are provided for receiving polarizable electrodes 55 and 56, respectively. As previously mentioned, these polarizable electrodes are mainly composed of a mixture of active carbon and an electrolyte and may be formed before being inserted into the openings 53 and 54 or may be injected therein in the form of paste. These polarizable electrodes 55 and 56 are preferably fitted in the openings 53 and 54, respectively, when the components are assembled into the complete unit.

A separator 57 is adapted to be interposed between the upper gasket 51 and the lower gasket 52. The separator 57 may be formed from a polyolefin compound which promotes ionically conductive but prevents electronic conduction. A collector electrode 58 is provided on the upper surface of the upper gasket 51. The collector electrode 58 comprises an insulating plate 60 having electrically-conductive layers 61 and 62 formed on opposite sides thereof as shown and connected to each other by an opening 63.

The electrically-conductive layer 61 is connected to the surface of the polarizable electrode 55 to serve as an electrically-conductive layer. The electrically-conductive layer 62 serves as an electrically-conductive connecting layer.

A collector electrode 59 is provided on the lower surface of the lower gasket 52. The collector electrode 59 comprises an insulating plate 64 having electrically-conductive layers 65 and 66 formed on opposite sides thereof as shown and connected to each other by an opening 67 piercing therethrough. The electrically-conductive layer 65 is connected to the surface of the polarizable electrode 56 to serve as an electrically-conductive layer. The electrically-conductive layer 66 serves as an electrically-conductive connecting layer. As the material for the insulating plates 60 and 64 there may be selected a gas-tight material such as ceramic, glass, rubber, and resin. As the material for the electrically-conductive layers 61 and 62 and the electrically-conductive layers 65 and 66 there may be selected carbon film, electrically-conductive film or metal film formed by a vacuum deposition process, a sputtering process, an electroless plating process, or lamination.

For assembly into an integrated body, these components may be bonded with an adhesive. Specifically, the upper and lower gaskets 51 and 52 are bonded to the separator 57 with an adhesive and are also bonded to the collector electrodes 58 and 59, respectively, with an adhesive. Alternatively, if the upper and lower gaskets 51 and 52 are made of unvulcanized rubber, these gaskets may be bonded to the separator and the collector electrodes by heating.

According to the above embodiment, the collector electrode is composed of an insulating plate having an electrically-conductive layer contacting with a polarizable electrode formed on one side thereof and an electrically-conductive connecting layer formed on the other. Thus, a collector electrode having a sufficiently low volumetric resistance can be provided. Furthermore, since there is no possibility of gas permeation the air-tightness of the capacitor element can be improved. Moreover, even when these capacitor elements are accumulated for series connection it is easy to make electrical connection. In addition, this collector electrode is advantageous in that the terminal arrangement for external connection can be simplified.

Figure 9:
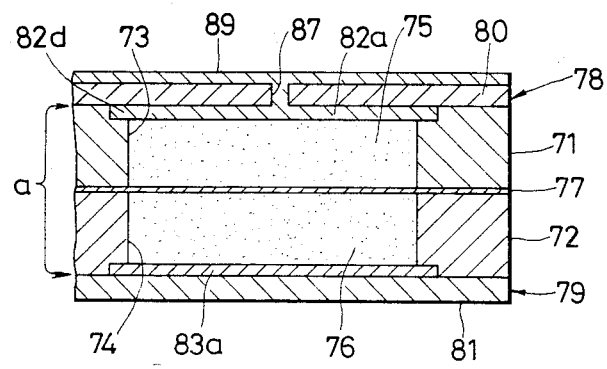
FIG. 9 is a sectional view taken along the line 9—9 of FIG. 8 when the components are assembled into the complete unit.
Figure 8:
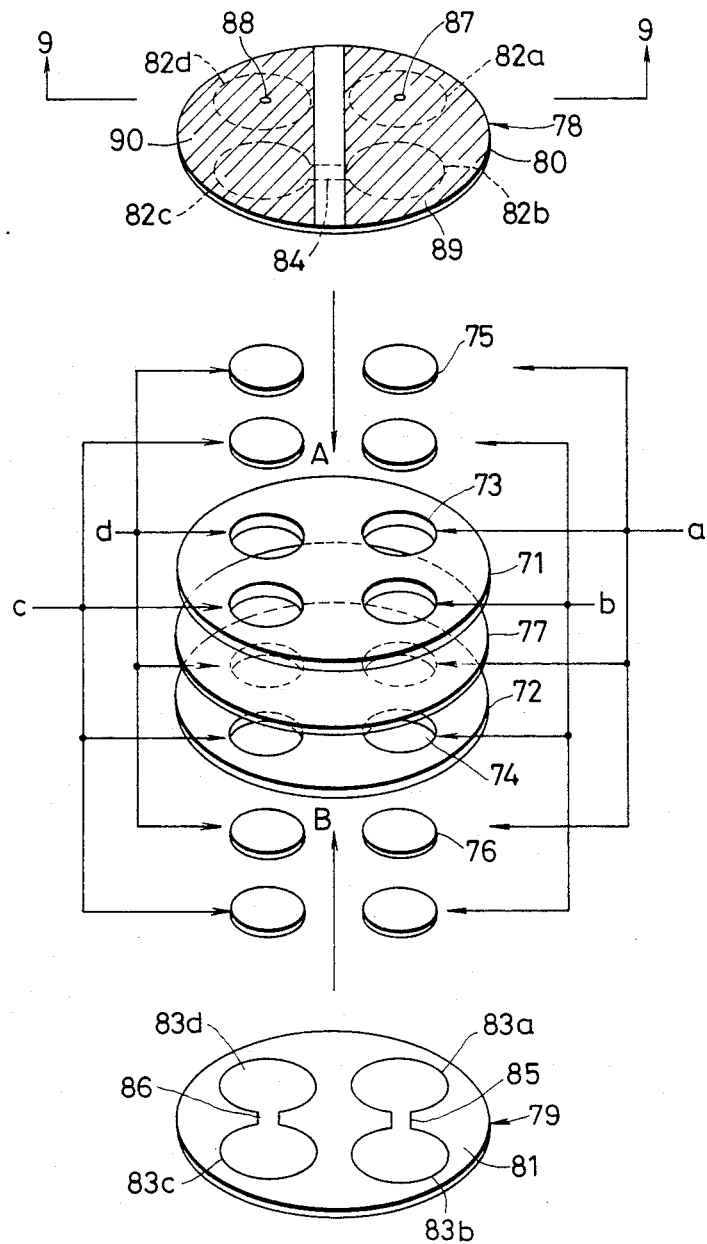
FIG. 8 is an exploded perspective view of another embodiment of the present invention.

FIGS. 8 and 9 show another embodiment of this invention. This embodiment is a monoblock electric double layer capacitor which includes a plurality of electric double layer capacitor elements.

This embodiment has common arrangements with the embodiment of FIG. 7. Referring to FIG. 7, upper and lower gaskets 71 and 72 have a plurality of openings 73 and 74 piercing therethrough, respectively. Polarizable electrodes 75 and 76 are received in the openings 73 and 74, respectively, and a separator 77 is adapted to be interposed between the upper gasket 71 and the lower gasket 72. Although the illustrated embodiment uses only one sheet of separator 77, a separator covering the area of the respective openings 73 or 74 and their circumference may be individually interposed between these gaskets.

A collector electrode 78 is provided on the upper surface of the upper gasket 71. As shown in detail in FIG. 9, the collector electrode 78 comprises an insulating plate 80 having electrically-conductive layers 82a to 82d formed on the lower surface thereof. A collector electrode 79 comprises an insulating plate 81 having electrically-conductive layers 83a to 83d formed on the upper surface thereof. The above polarizable electrodes 75 and 76 are received in the upper and lower gaskets 71 and 72. The separator 77 is interposed between the gaskets 71 and 72, and the collector electrodes 78 and 79 are assembled as shown by the arrows A and B to provide an integrated body which has electric double layer capacitor elements a, b, c and d formed therein.

Specifically, the above electrically-conductive layers 82a to 82d and the electrically-conductive layers 83a to 83d are formed at the locations corresponding to the electric double layer capacitor elements a to d, respectively, to serve as electrically-conductive layers for the polarizable electrode. The electrically-conductive layers 82b and 82c formed on the lower surface of the insulating plate 80, are electrically connected to each other by a connecting conductor 84. The electrically-conductive layers 83a and 83b formed on the insulating plate 81 are electrically connected to each other by a connecting conductor 85. Similarly, the electrically-conductive layers 83c and 83d formed on the same surface of the plate 81, are electrically connected to each other by a connecting conductor 86. Accordingly, once assembled, these electric double layer capacitor elements a to d are electrically connected in series in this order.

With regard to such a series combination of the electric double layer capacitor elements a to d as an integrated body, the electrically-conductive layers 82a and 82d correspond to the opposite ends thereof. These electrically-conductive layers 82a and 82d are electrically connected to electrically-conductive connecting layers 89 and 90, respectively, formed on the insulating plate 80 by openings 87 and 88.

The above embodiment shows an example of a monoblock electric double layer capacitor which comprises a plurality of electric double layer capacitor elements. Also, in this embodiment, as the collector electrode, there is employed an insulating plate having an electrically-conductive layer with a polarizable electrode formed on one side thereof and an electrically-conductive connecting layer to be brought in conduction with the electrically-conductive layer for the polarizable electrode formed on the other side. Therefore, there is no possibility of gas permeation, thus improving the airtightness of the capacitor element. Furthermore, this embodiment is advantageous in that the construction is such that an electrical series combination of electric double layer capacitor elements is contained in a monoblock electric double layer capacitor to improve the electric strength thereof. Moreover, the construction requiring a single pair of gaskets for accommodating a plurality of electric double layer capacitor elements enables reduction of cost and simplification of production as compared to embodiments requiring a gasket for each cell. In addition, when these electrically-conductive layers for the polarizable electrodes are properly connected, a parallel combination is also possible.

Although the collector electrodes in the above embodiments have an electrically-conductive layer for the polarizable electrode and an electrically-conductive connecting layer connected to each other by an opening through an insulating plate, the connection may also be made by a connecting conductor formed on the side of the insulating plate.

As can be seen from the above description, the electric double layer capacitor of the invention comprises a collector electrode composed of an insulating plate having an electrically-conductive layer in contact with a polarizable electrode formed on one side thereof and an electrically-conductive connecting layer connected to said electrically-conductive layer for polarizable electrode formed on the other side. Since a gas-tight material such as ceramic, glass, rubber, and resin can be used as the insulating plate, there is no possibility of gas permeation, thus improving the air-tightness thereof. Furthermore, since the construction is such that an electrically-conductive connecting layer is formed on the insulating plate, the volumetric resistibility of the electrically-conductive connecting layer can be sufficiently low and the connecting terminals can be easily made. At the same time, such a construction is also advantageous in that accumulation is made possible for a series connection.

While the salient features of the invention have been described with reference to the drawings, it should be understood that the preferred and alternate embodiments described herein are susceptible of modification and alteration without departing from the spirit and scope of the following claims.

What is claimed is:

1. A capacitor comprising:
   a plurality of double-layer capacitive elements, each of said capacitive elements comprising a first polarizable electrode made of a mixture of carbon and electrolyte, a second polarizable electrode made of a mixture of carbon and electrolyte, and an electrically insulative-ionically conductive separator between said first and said second polarizable electrodes, wherein each of said first polarizable electrodes is pair-wise associated with a different one of said second polarizable electrodes with said electrically insulative-ionically conductive separator being interposed between associated polarizable electrodes;
   an insulative material for electrically insulating said capacitive elements from each other, wherein said insulative material for electrically insulating said capacitive elements includes an upper gasket having a first plurality of apertures singly receiving said first polarizable electrodes, and a lower gasket having a second plurality of apertures singly receiving said second polarizable electrodes;
   a first collector electrode for connecting said first polarizable electrodes; and
   a second collector electrode for connecting said second polarizable electrodes.

2. A capacitor according to claim 1, wherein said first collector electrode and said second collector electrode are formed to connect selected ones of said pairs of polarizable electrodes in series.

3. A capacitor according to claim 2 wherein said first collector electrode and said second collector electrode are further formed to connect others of said pairs of polarizable electrodes in parallel.

4. A capacitor comprising:
   a plurality of double-layer capacitive elements, each of said capacitive elements comprising a first polarizable electrode, a second polarizable electrode, and an insulative separator therebetween;
   an insulative material for electrically insulating said capacitive elements from each other; and
   a first collector electrode on one side of said capacitive elements and a second collector electrode on the other side of said capacitive elements, at least said first collector electrode including an insulating layer, an electrically-conductive layer formed on one side of said insulating layer and in electrical contact with said capacitive elements, and an electrically-conductive connecting layer formed on the other side of said insulating layer, and selective connections formed through said insulating layer to electrically connect said electrically-conductive layer and said electricallyconductive connection layer.

5. A capacitor according to claim 4 wherein said insulative material comprises an electrically insulative gasket having a plurality of apertures therethrough, each of said apertures for receiving a different one of said capacitive elements.

6. A capacitor comprising:
   a plurality of double-layer capacitive elements, each of said capacitive elements including
   a first polarizable electrode made of a mixture of carbon and electrolyte,
   a second polarizable electrode made of a mixture of carbon and electrolyte,
   an electrically insulative-ionically conductive separator therebetween, wherein each of said first polarizable electrodes is pair-wise associated with a different one of said second polarizable electrodes with said electrically insulative-ionically conductive separator being interposed between associated polarizable electrodes, means for electrically insulating said capacitive elements from each other, wherein said means for electrically insulating said capacitive elements includes an upper gasket having a first plurality of apertures singly receiving said first polarizable electrodes and a lower gasket having a second plurality of apertures singly receiving said second polarizable electrodes, a first collector electrode connected to said first polarizable electrodes, and a second collector electrode connected to said second polarizable electrodes; and first and second terminal plates for interconnecting said plurality of double-layer capacitive elements.

7. A capacitor according to claim 6 wherein said first collector electrode and said second collector electrode are formed to connect selected ones of said pairs of polarizable electrodes in series.

8. A capacitor according to claim 7 wherein said first collector electrode and said second collector electrode are further fomred to connect others of said pairs of polarizable electrodes in parallel.

* * * * *